United States Patent
Zhang et al.

(10) Patent No.: US 10,922,196 B2
(45) Date of Patent: Feb. 16, 2021

(54) METHOD AND DEVICE FOR FILE BACKUP AND RECOVERY

(71) Applicant: EMC IP Holding Company LLC, Hopkinton, MA (US)

(72) Inventors: Jimmy Zhibin Zhang, Chengdu (CN); Yizhou Zhou, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 220 days.

(21) Appl. No.: 15/954,765

(22) Filed: Apr. 17, 2018

(65) Prior Publication Data
US 2018/0300207 A1     Oct. 18, 2018

(30) Foreign Application Priority Data

Apr. 17, 2017   (CN) .......................... 2017 1 0250225

(51) Int. Cl.
*G06F 16/00* (2019.01)
*G06F 11/14* (2006.01)
*G06F 16/172* (2019.01)

(52) U.S. Cl.
CPC ...... *G06F 11/1469* (2013.01); *G06F 11/1451* (2013.01); *G06F 16/172* (2019.01); *G06F 2201/84* (2013.01)

(58) Field of Classification Search
CPC .............. G06F 11/1469; G06F 16/172; G06F 11/1451; G06F 2201/84
USPC ....................................................... 707/651
See application file for complete search history.

(56) References Cited

U.S. PATENT DOCUMENTS

| | | | | |
|---|---|---|---|---|
| 7,676,514 | B2 * | 3/2010 | Faibish | G06F 3/0631 707/646 |
| 8,489,815 | B2 * | 7/2013 | Iyigun | G06F 12/0871 711/118 |
| 8,812,455 | B1 | 8/2014 | Claudatos et al. | |
| 9,075,754 | B1 | 7/2015 | Sadhu | |
| 9,389,965 | B1 | 7/2016 | Douglis et al. | |
| 9,594,753 | B1 | 3/2017 | Pang et al. | |
| 9,645,893 | B1 * | 5/2017 | Hebbar | G06F 11/1453 |
| 9,916,203 | B1 | 3/2018 | Pogde et al. | |
| 10,423,583 | B1 * | 9/2019 | Dobrean | G06F 16/2455 |
| 2005/0216788 | A1 * | 9/2005 | Mani-Meitav | G06F 11/1456 714/6.32 |
| 2012/0215746 | A1 * | 8/2012 | Auchmoody | G06F 16/10 707/674 |
| 2013/0080703 | A1 * | 3/2013 | Kumagai | G06F 9/5072 711/117 |
| 2014/0136892 | A1 * | 5/2014 | Wu | G06F 3/061 714/15 |

* cited by examiner

Primary Examiner — Monica M Pyo
(74) Attorney, Agent, or Firm — BainwoodHuang (57) ABSTRACT

Embodiments of the present disclosure provide a method and device for file backup and recovery. The method for file backup comprises receiving a file to be backed up and metadata describing an attribute of the file. The method further includes storing the metadata into a cache. The method further includes storing the file into a storage device for data backup. The method further includes receiving, from the storage device, information that indicates a storage position of the file in the storage device. Besides, the method further includes storing the information into the cache at an address that is determined based on the metadata.

7 Claims, 7 Drawing Sheets

METHOD AND DEVICE FOR FILE BACKUP AND RECOVERY

RELATED APPLICATIONS

This application claim priority from Chinese Patent Application Number CN201710250225.6, filed on Apr. 17, 2017 at the State Intellectual Property Office, China, titled "METHOD AND DEVICE FOR FILE BACKUP AND RECOVERY" the contents of which is herein incorporated by reference in its entirety.

FIELD

Embodiments of the present disclosure generally relate to the field of data storage, and more specifically, to a method and system of file backup and recovery.

BACKGROUND

A Network Attached Storage (NAS) device is typically configured as a node of the network in a local area network. As the NAS device is directly arranged in the local area network, a user is allowed to directly access the data on the network. In this arrangement, the NAS device may manage and process all data on the network in a centralized manner, thereby reducing a load of the application or enterprise server and lowering the cost.

Upon receiving a large amount of data from the network, the network attached storage device needs to perform backup processing on the received data, in order to ensure data safety. In a backup process, a backup management system is typically used to store data on the network attached storage device to a backup storage system. In general, during data backup, all information of the data will be stored in the backup system; and if the backup data are to be recovered, it is required to retrieve the corresponding data in the backup system. Due to a great number of comparison operations required during the retrieve in the backup system and a relatively slow processing speed of the backup system, the recovery process of data is prolonged, and the cost for receiving the backup data is increased accordingly.

SUMMARY

The purpose of the present disclosure is to provide a method for file backup and recovery.

According to a first aspect of the present disclosure, there provides a method for file backup. The method comprises receiving a file to be backed up and metadata describing an attribute of the file; storing the metadata into a cache; storing the file into a storage device for data backup; receiving, from the storage device, information that indicates a storage position of the file in the storage device; and storing the information into the cache at an address that is determined based on the metadata.

In some embodiments, the metadata includes: indication information of a file type; and indication information of a storage position of the metadata.

In some embodiments, the address is determined based on the metadata by: determining the address based on the indication information of the file type and the indication information of the storage position.

In some embodiments, information of the storage position includes position information, type information, a storage unit ID and offset information of the file in the storage device.

According to a second aspect of the present disclosure, there provides a method for file recovery. The method comprises receiving data for recovering a file; determining, based on the received data, metadata describing an attribute of the file in a cache; determining, based on the metadata, information that indicates a storage position of the file in a storage device in the cache; obtaining the file from the storage device based on the storage position; and transmitting the file to implement the file recovery.

In some embodiments, the data for recovering the file includes: the indication information of the storage position of the metadata.

According to a third aspect of the present disclosure, there provides an electronic device. The electronic device comprises: at least one processor; and a memory coupled to the at least one processor and having instructions stored thereon which, when executed by the at least one processor, cause the device to perform acts including: receiving a file to be backed up and metadata describing an attribute of the file; storing the metadata into the cache; storing the file into a storage device for data backup; receiving, from the storage device, information that indicates a storage position of the file in the storage device; and storing the information into the cache at an address that is determined based on the metadata.

According to a fourth aspect of the present disclosure. The electronic device comprises: at least one processor; and a memory coupled to the at least one processor and having instructions stored thereon which, when executed by the at least one processor, cause the device to perform acts including: receiving data for recovering a file; determining, based on the received data, metadata describing an attribute of the file in the cache; determining, based on the metadata, information that indicates a storage position of the file in a storage device in the cache; obtaining the file from the storage device based on the storage position; and transmitting the file to implement file recovery.

According to a fifth aspect, there provides a computer program product, the computer program product being tangibly stored on a non-volatile computer readable medium and including machine executable instructions which, when executed, cause the machine to execute steps of the method according to the first aspect and the second aspect of the present disclosure.

It should be appreciated that this Summary is not intended to identify key features or essential features of the claimed subject matter, nor is it intended to be used to limit the scope of the claimed subject matter. Other features of the present disclosure will be made apparent by the following description.

BRIEF DESCRIPTION OF THE DRAWINGS

Through the following detailed description of the example embodiments of the present disclosure with reference to the accompanying drawings, the above and other objectives, features, and advantages of example embodiments of the present disclosure will become more apparent, wherein, in the example embodiments of the present disclosure, identical reference signs typically represent identical components.

Throughout the drawings, the same or corresponding reference signs refer to the same or corresponding elements.

DETAILED DESCRIPTION OF EMBODIMENTS

Principles of example embodiments disclosed herein will now be described with reference to some example embodiments. It should be appreciated that description of those embodiments is merely to provide explanation and enable those skilled in the art to better understand and further implement example embodiments disclosed herein and is not intended for limiting the scope disclosed herein in any manner. The content of the present disclosure described herein may be implemented in various manners, besides the one described below.

As used herein, the term "includes" and its variants are to be understood as open-ended terms, which mean "includes, but is not limited to." The term "based on" can be understood as "based at least in part on." The term "one embodiment" can be understood as "at least one embodiment." The term "another one embodiment" is to be read as "at least one another embodiment."

A network attached storage (NAS) device is typically used to store data on the network. The data in the NAS device is typically backed up to a backup memory via a file backup system when the data therein are being backed up, and the backup data includes a file, a directory file, an access control list (ACL), or the like. Since the data are directly backed up to a storage device, it is often required to search the directory in the backup memory during data restoration, and the data are obtained by comparison. As there is a great amount of data within the backup memory and its running speed is relatively slow, the speed for data backup and recovery is decelerated and the use cost thereof is increased accordingly.

In order to at least solve the above problem and other potential problems, embodiments of the present disclosure provide a solution for file backup and recovery. In this solution, the efficiency for data backup and recovery is improved by providing a cache within the file backup system.

Figure 1:
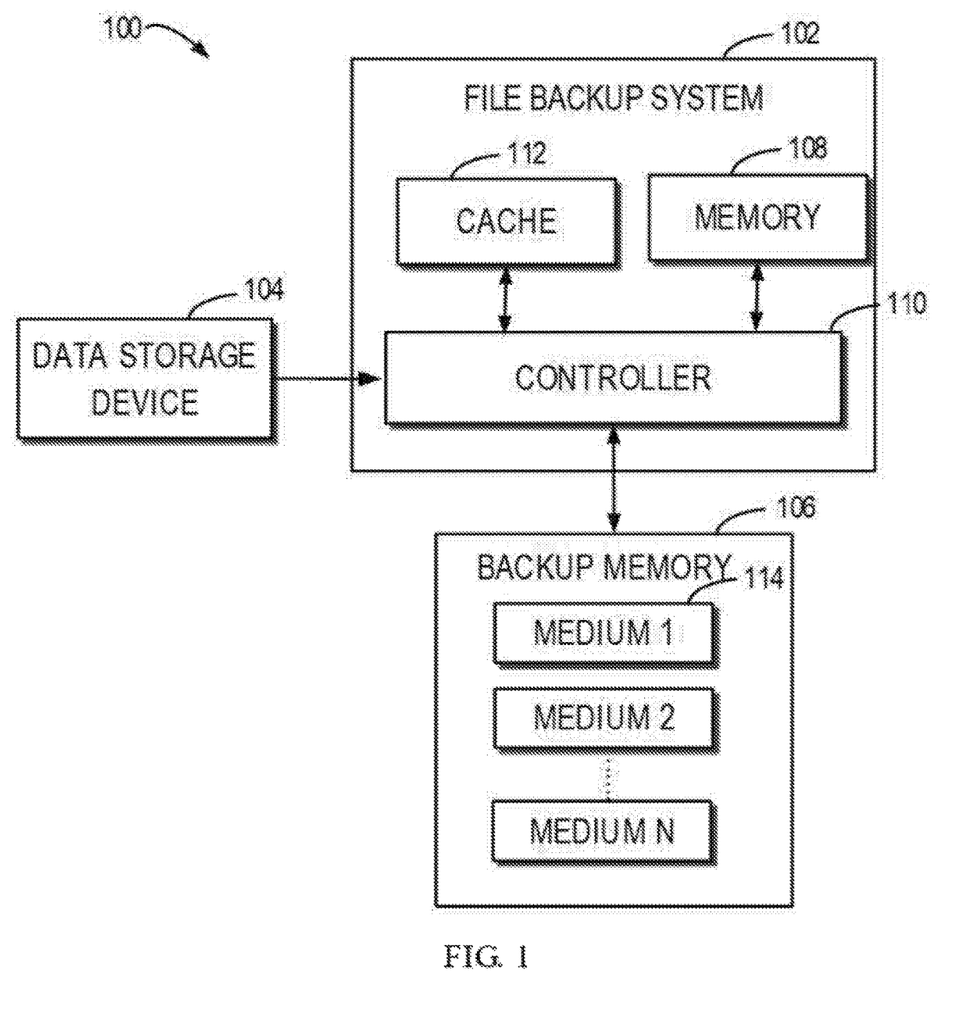
FIG. 1 shows an architecture diagram of a storage system 100 according to embodiments of the present disclosure.

FIG. 1 shows an architecture diagram of a storage system 100 according to embodiments of the present disclosure. The storage system 100 includes a data storage device 104. In an example, the data storage device 104 may be a NAS device. The NAS device 104 may be connected to a network and receives a large amount of data from the network. The storage system 100 may further include a file backup system 102 and a backup memory 106. In the example, the file backup system is a file backup system for backing up data to be stored. In order to ensure data safety in the storage device, the file backup system 102 backs up the data on the storage device 104 to the backup memory 106. Alternatively or in addition, the data storage device may be other data storage devices.

The storage device 104 is a device for storing data, and it is required to back up data out of the need of data safety. The storage device 104 may be a NAS device, a direct-attached storage (DAS) device, a storage area network (SAN) device and other devices for storing and backing up data.

The backup memory 106 is a storage device for storing a large amount of data. The storage device may include various volatile and/or nonvolatile data storage media. The example of the storage medium may include, but is not limited to a disk, an optical disk, a hard disk, a solid state disk (SSD), and a cache.

In order to implement rapid access to the data in the backup memory 112, a cache 112 is arranged in the file backup system, and the cache 112 stores key data for data backup, to achieve rapid backup of data. The file backup system 102 further includes a memory 108 and a controller 110.

In this example, the data storage device 110 in FIG. 1 is a NAS device which transmits data to the file backup system 112 via a network data management protocol (NDMP). The transmitted data includes the file to be backed up and metadata describing attributes of the file, and the metadata include one or more of the following item: a file type, name, size, route, index node value, etc., of the file stored in the NAS device. Alternatively or in addition, the index node value is indication information of a storage position of the metadata of the file stored in the NAS. In one example, the indication information may be address information. In another example, the indication information is a value dedicated to an identifier node allocated in the NAS device, for example, if the index node information is stored in a manner similar to an array, the node value is the position in the array. The process of file backup implemented through the cache will be described below, referring to FIG. 2.

Figure 2:
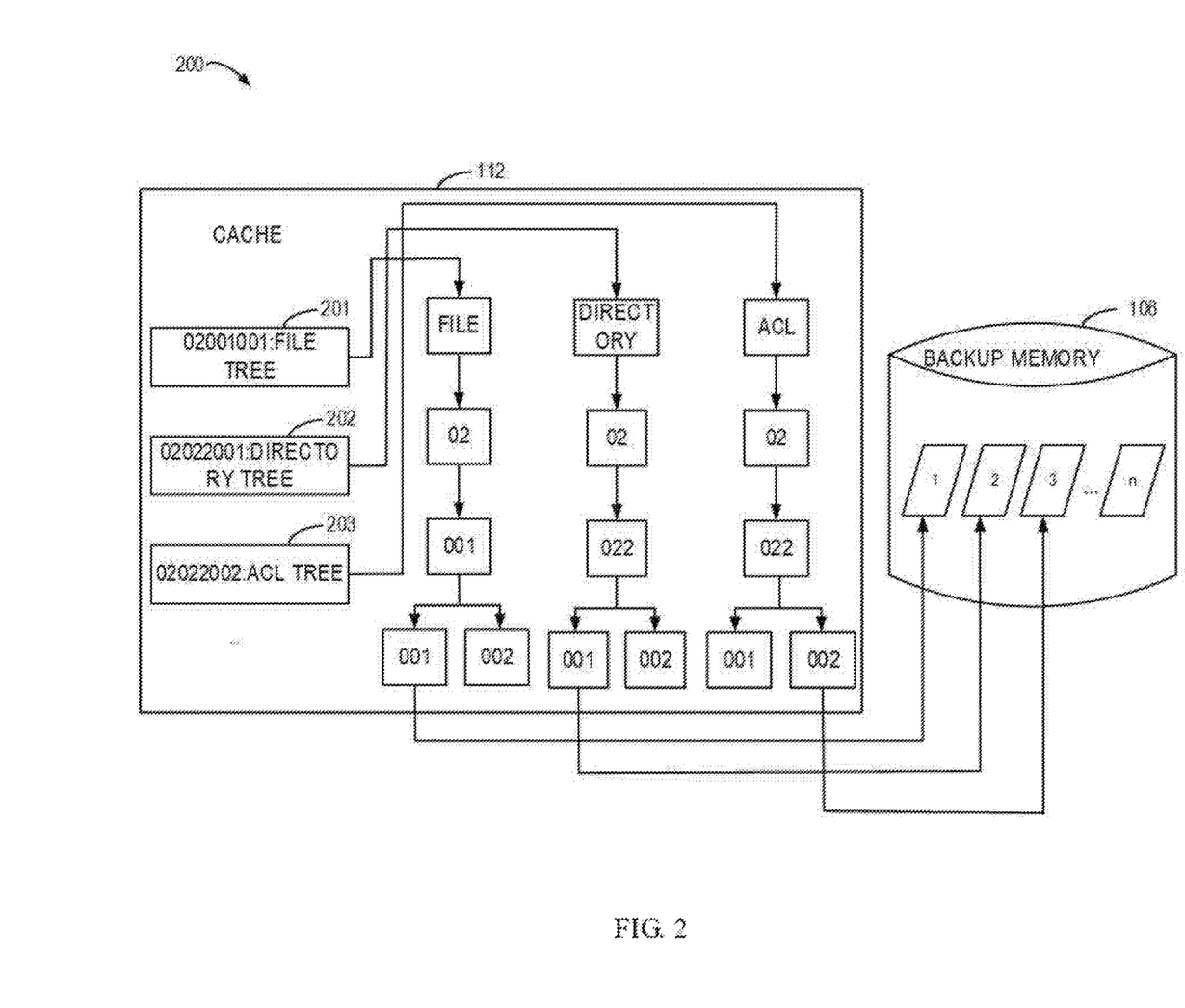
FIG. 2 shows a schematic diagram of a mapping relation 200 of data according to embodiments of the present disclosure.

FIG. 2 shows a diagram of a mapping relation of data according to embodiments of the present disclosure. After receiving the data to be backed up from the NAS device, the file backup system 102 acquires the indication information of the file type and the index node (inode) value from the data. The indication information of the file type and the inode value form a data 201 to be stored in the cache. When backup data include a great number of files, multiple data 201, 202, 203, . . . , are formed, and the formed data are stored in the cache. In one example, the multiple generated data may be stored in a form of array, and in other examples, these generated data may be stored in other appropriate manners. Alternatively or in addition, the formed data may be stored in a specified storage space.

Two portions of data 201, 202, 203 . . . form two mapping addresses. In one example, the data obtained from the indication information of the file type acts as a first address mapped to a corresponding tree, and if the type is a file, the indication information is mapped to a storage address of a root node of the file tree. Similarly, if the file type is a directory or access control list, the indication information of the file type is mapped to a storage address of the root node of the directory tree or access control list tree. Additionally or alternatively, the type of the file may be any type of various files used in the computer.

Take the data 201 as an example, after mapping to the root node of the file tree based on the indication information of the file type, the data 201 is mapped to the leaf node of the file tree based on the index node value, i.e., after searching the address of the file tree root node, the address of the leaf node of the file tree is searched based on the index node value. In one example, the index node may be denoted by 8 hexadecimal numbers. The 8 numbers are divided into multiple sections to represent multiple layers of the tree. For example, the three layers of the tree formed by the 8 numbers are divided in a form of digits 2, 3, 3. Referring to FIG. 2, the index node value in the data 201 are "0X02001001", the corresponding tree thereof is divided into three layers, and the layers respectively correspond to 2 digits, 3 digits and 3 digits of the index node value. For example, the data 201 are divided into "02", 001" and "001", and the leaf node 001 of the file tree is found in this way, as shown in FIG. 2. In another example, the value of the index node may be set as a value having any digits. Likewise, the data 202 and 203 may be mapped to corresponding leaf nodes of the tree in this way, as well.

As described above, based on the received indication information of the file type and the index node value, an address, namely the leaf node of the tree, is determined in a cache. The information stored at the address is the information described below. The information of the metadata is backed up in the cache, and the data to be backed up, including the file, are transmitted to the backup memory 106. Upon storing the backup file in the backup memory 106, information of the storage position of the file will be generated in the backup memory. In one example, the information of the storage position of the file includes, but is not limited to, position information, type information, a storage unit ID and offset information of the file in the backup memory. After the backup memory 106 generates the information of the storage position of the file, the backup memory 106 transmits the information to the file backup system 112. Then the information is stored into the file backup system 112, and the storage address of the information is the address determined, as described above, in the cache by the indication information of the file type and the index node value. Therefore, by storing the data formed by the indication information of the file type and the index node value in the cache, as well as the information of the storage positions of the files corresponding thereto, the target backup data may be obtained quickly by utilizing the mapping relation stored in the cache when the backup file is searched, so as to implement data recovery. The backup process of the data will be described below with reference to FIG. 3. The recovery process of data will be detailed with reference to FIG. 4.

Figure 3:
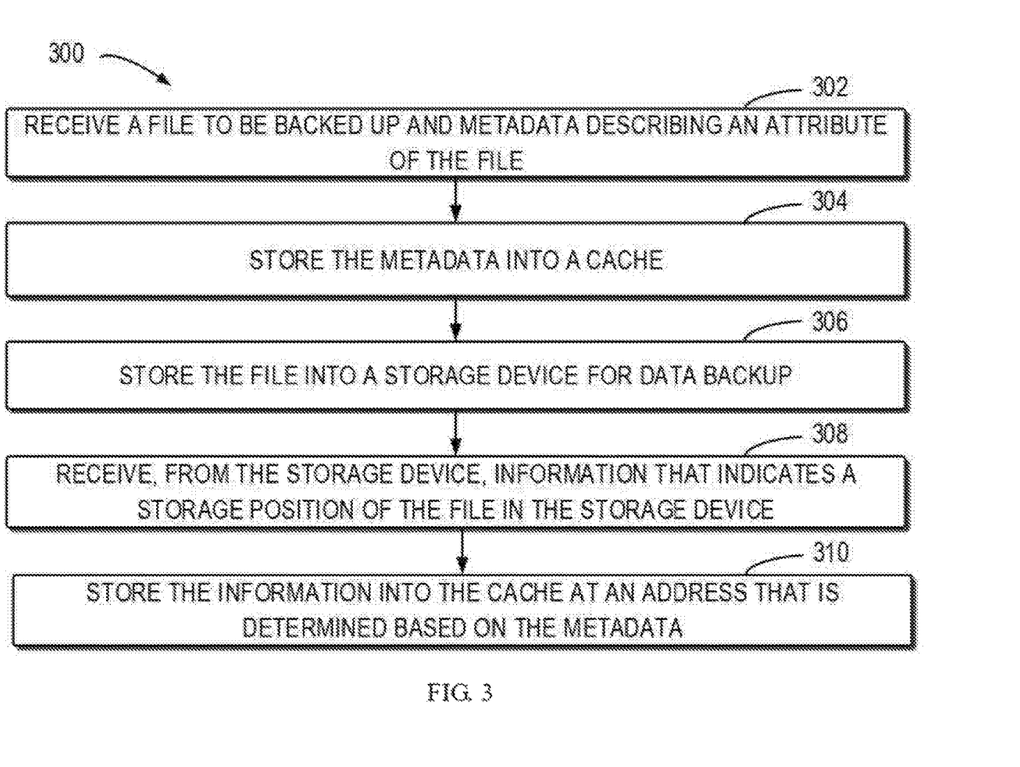
FIG. 3 illustrates a flow chart of a method 300 for file backup according to embodiments of the present disclosure.

FIG. 3 shows a flowchart of a method 300 for file backup according to embodiments of the present disclosure. In the method of file backup disclosed in FIG. 3, at block 302, the file to be backed up and the metadata describing an attribute of the file are received. In FIG. 1, after the data storage device 104 obtains and stores the data, the data storage device 104 transmits the data to the file backup file 102 for data safety. In one example, the data storage device 104 transmits the data to the file backup system via the NDMP. The data transmitted based on the protocol includes the file and the metadata of the file. In one example, the metadata of the file at least include the indication information of the file type and the index node value. The index node value is indication information that indicates the storage position of the metadata of the file in the data storage device 104.

In a block 304, the metadata are stored into the cache. A cache 112 is arranged in the file backup system 102 in FIG. 1. Upon receiving the metadata, the file backup system 102 stores the metadata into the cache. Because the access speed of the cache is faster than the conventional storage device, the metadata are processed by the cache, such that the speed of process data is increased.

At block 306, the file is stored into a storage device for data backup. In FIG. 1, the data in the data storage device 104 are controlled by the file backup system 102 to back up the data to the backup memory 106. When the data to be backed up are stored into the backup memory 106, related information of the storage position of the stored file is generated. The information includes, but is limited to, the position information, type information, storage unit ID and offset information of the file stored in the backup memory.

At block 308, information that indicates the storage position of the file in the storage device is received from the storage device. In FIG. 1, the backup memory 106 transmits the information of storage position of the file, as stated in the foregoing, to the file backup system 102.

At block 310, the information is stored into the cache at an address that is determined based on the metadata. In FIG. 1, upon receiving the above mentioned information, the file backup system 102 stores the information of the storage position in the cache. The storage address of the storage position is determined based on the indication information of file type in the metadata and the indication information of the storage position of the metadata in the storage device 104. Determining the address has been discussed with reference to FIG. 2

Figure 4:
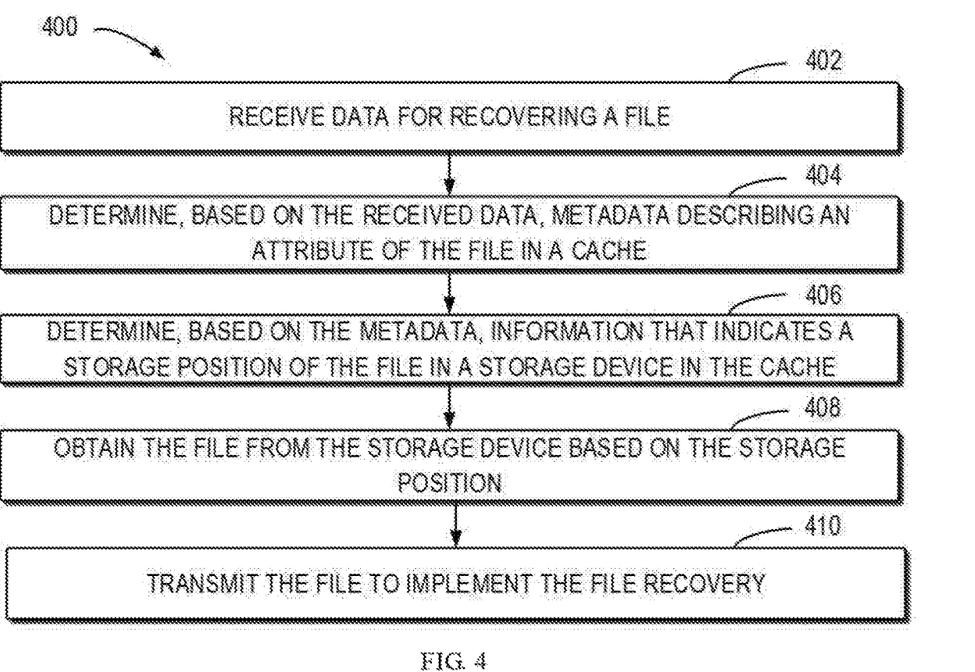
FIG. 4 illustrates a flow chart of a method 400 for file recovery according to embodiments of the present disclosure.

FIG. 4 illustrates a flowchart of a method 400 for file backup according to embodiments of the present disclosure. Referring to FIGS. 2 and 3, the file backup system will store in its cache the address information of the file stored in the backup memory 106, after the data is backed up. Accordingly, the backup data to be recovered may be found quickly using the cache of the file backup system 102. At block 402, data for recovering file are received. As shown in FIG. 1, if a part of data needs recovering in the data storage device 104, a request should be transmitted to the file backup system 102 to recover the duplicated data. In one example, the request at least includes the indication information which indicates the storage position of the metadata of the file in the data storage device 104, and the indication information may be denoted in a form of the index node value.

At block 404, the metadata describing an attribute of the file are determined in the cache based on the received data. In FIG. 2, when the file is being backed up, the metadata are stored in the cache. In one example, the metadata at least include the indication information of the file type and the index node value. The metadata may be stored into the cache with a certain data structure. Consequently, when the index node value is received, the metadata corresponding to the index node value may be determined. In another example, the data formed by the index node value and the indication information of the file type may be determined based on the index node value.

At block 406, the storage address for the information of the storage position is determined based on the metadata. The information of the storage position is information of the storage position of the file in the storage device. In view of the depiction on FIG. 2, based on the data, a first address, namely the root node of the file type tree, is determined by the indication information of the file type. Then, a corresponding leaf node, namely a second address, is searched based on the index node value. Referring to the depiction on FIG. 2, information of the storage position of the file in the backup memory 106 is stored at the address determined by the metadata.

At block 408, the file is obtained from the storage device based on the storage position. As the address of the file in the backup memory 106 is obtained, the file to be recovered can be searched quickly based on the address. In a block 410, the file is transmitted to implement the file recovery.

Figure 5:
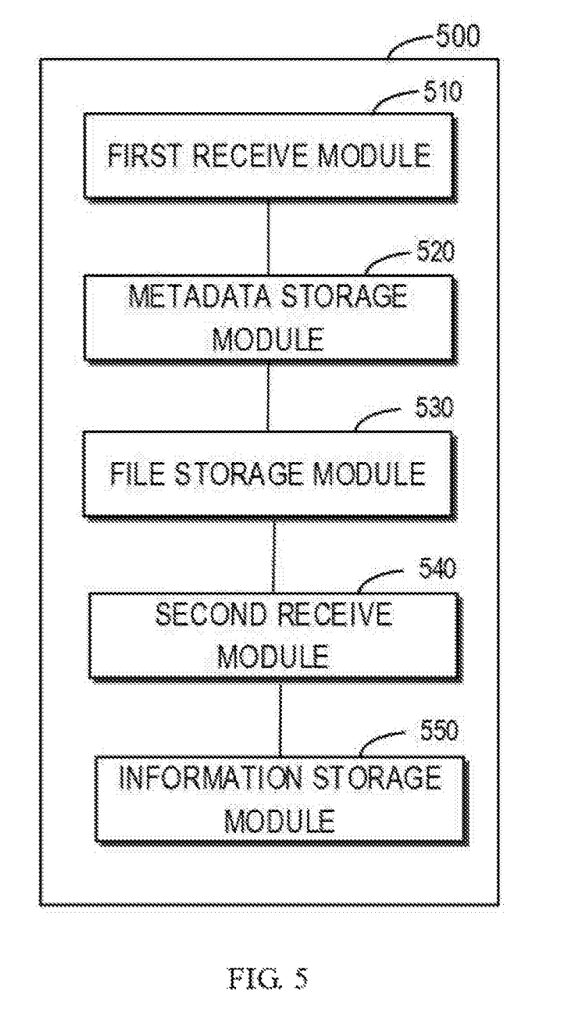
FIG. 5 illustrates a block diagram of a device 500 for file backup according to embodiments of the present disclosure.

FIG. 5 illustrates a block diagram of an apparatus 500 for file backup according to embodiments of the present disclosure. The apparatus 500 may include a first receive module 510, which is configured to receive a file to be backed up and metadata describing attributes of the file. The apparatus 500 may further include a metadata storage module 520, which is configured to store metadata to the cache. The apparatus 500 may further comprise a file storage module 530, which is configured to store the file to the storage device for data backup. The apparatus 500 may further include a second receive module 540, which is configured to receive information of a storage position of the file in the storage device. Besides, the apparatus 500 may include an information storage module 550, which is configured to store information in the cache at an address which is determined based on the metadata.

Figure 6:
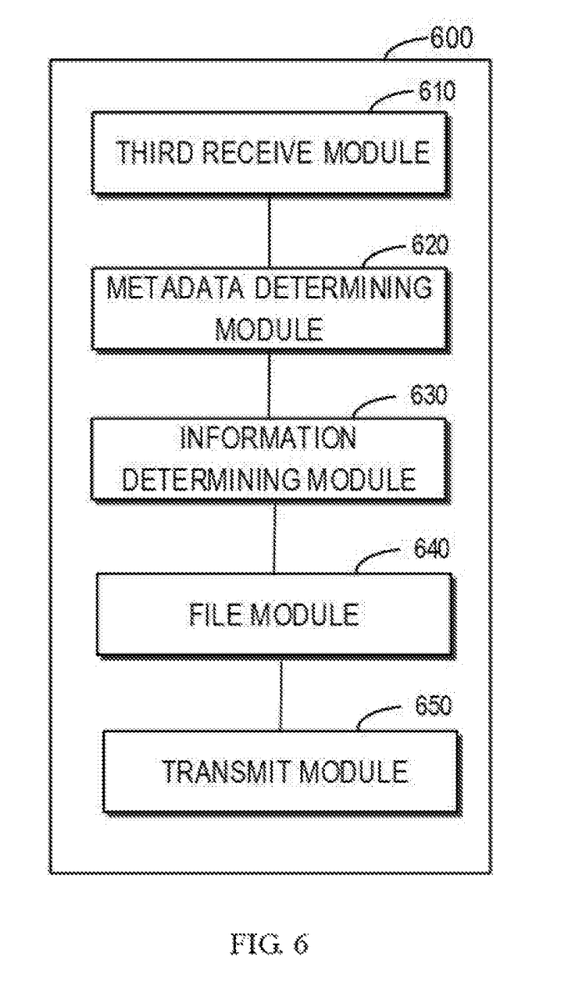
FIG. 6 illustrates a block diagram of a device 600 for file recovery according to embodiments of the present disclosure.

FIG. 6 illustrates a block diagram of an apparatus 600 for file backup according to embodiments of the present disclosure. The apparatus 600 may include a third receive module 610 configured to receive data for file recovery. The apparatus 600 may also include a metadata determining module 620 configured to determine in a cache metadata describing attributes of the file based on the received data. The apparatus 600 may further include an information determining module 630 configured to determine information in the cache which indicates a storage position of the file in the storage device based on the metadata. The apparatus 600 may also include a file module 640 configured to obtain the file from the storage device based on the storage position. Besides, the apparatus 600 may include a transmit module 650 configured to transmit the file to implement file recovery.

For clarity, some optional modules of the apparatus 500 and/or 600 are not shown in FIG. 5 and/or FIG. 6. However, it is to be understood that all features as described with reference to FIGS. 1-4 may be applicable to the apparatus 500 and/or 600. Moreover, each module of the apparatus 500 and/or 600 may be hardware module, or may be software module. For example, in some embodiments, the apparatus 500 and/or 600 may be partly or entirely implemented using software and/or firmware, and for example, may be implemented as a computer program product included on a computer readable medium. Alternatively or in addition, the apparatus 500 and/or 600 may be partly or entirely implemented based on hardware, such as an Integrated Circuit (IC), Application-specific Integrated Circuit (ASIC), System-on-a-chip systems (SOC), Field Programmable Gate of Arrays (FPGA), or the like. The scope of the present disclosure is not limited in this aspect.

Figure 7:
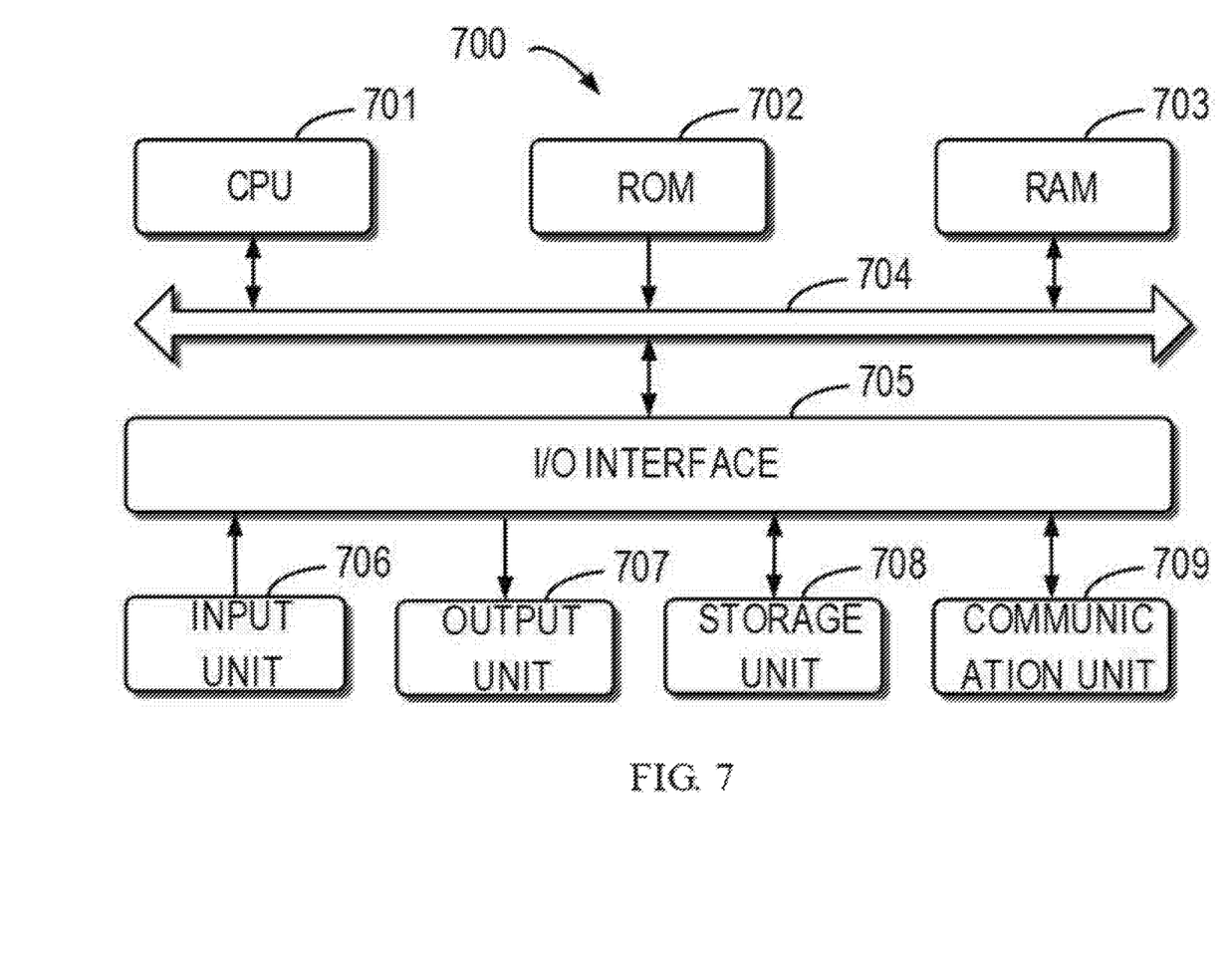
FIG. 7 shows a schematic block diagram of an example device 700 adapted to implement embodiments of the present disclosure.

FIG. 7 shows a schematic block diagram of an example device 700 adapted to implement embodiments of the present disclosure. For example, any one of 102, 104 and 106 as shown in FIG. 1 may be implemented by the device 700. As shown therein, the device 700 comprises a central processing unit (CPU) 701 that may perform various appropriate actions and processing based on computer program instructions stored in a read-only memory (ROM) 702 or computer program instructions loaded from a storage section 708 to a random access memory (RAM) 703. In the RAM 703, various programs and data needed for operations of the device 700 are further stored. The CPU 701, ROM 702 and RAM 703 are connected to each other via a bus 704. An input/output (I/O) interface 705 is also connected to the bus 704.

The following components in the device 700 are connected to the I/O interface 705: an input unit 706, such as a keyboard, a mouse and the like; an output unit 707, such as various kinds of displays and a loudspeaker, etc.; a memory unit 708, such as a magnetic disk, an optical disk, and etc.; a communication unit 709, such as a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the method 300 or 400, may be executed by the processing unit 701. For example, in some embodiments, the method 300 may be implemented as a computer software program that is tangibly embodied on a machine readable medium, e.g., the storage unit 708. In some embodiments, part or all of the computer programs may be loaded and/or mounted onto the device 700 via ROM 702 and/or communication unit 709. When the computer program is loaded to the RAM 703 and executed by the CPU 701, one or more acts of the method 300 or 400 as described above may be executed.

The present disclosure may be a method, a device, a system, and/or a computer program product. The computer program product may include a computer readable storage medium (or media) having computer readable program instructions thereon for performing aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the scenario involving the remote computer, the remote computer may be connected to the user's computer through any type of network, including a local area network (LAN) or a wide area network (WAN), or the connection may be made to an external computer (for example, through the Internet using an Internet Service Provider). In some embodiments, the electronic circuitry can be personalize customized by utilizing state information of the computer readable program instructions, for example, programmable logic circuitry, field-programmable gate arrays (FPGA), or programmable logic arrays (PLA). The electronic circuitry may execute the computer readable program instructions, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can enable a computer, a programmable data processing apparatus, and/or other devices to function in a particular manner, such that the computer readable storage medium having instructions stored therein comprises an article of manufacture, which includes instructions implementing aspects of the function/act specified in block or blocks of the flowchart and/or block diagram.

The computer readable program instructions may also be loaded onto a computer, other programmable data processing apparatus, or other device to cause a series of operational steps to be performed on the computer, other programmable data processing apparatus or other device to produce a computer implemented process, such that the instructions which execute on the computer, other programmable data processing apparatus, or other device implement the functions/acts specified in block or blocks of the flowchart and/or block diagram.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of instruction, which comprises one or more executable instructions for implementing the specified logical function(s). In some alternative implementations, the functions noted in the block may occur in a different order than noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies in the marketplace, or to enable others of ordinary skilled in the art to understand the embodiments disclosed herein.

We claim:

1. A method for file backup, comprising:
   receiving, at a file backup system from a data storage device, a file to be backed up and metadata describing attributes of the file, the attributes of the file including a type of the file and a storage position of the metadata in the data storage device;
   storing the metadata into a cache of the file backup system;
   storing the file into a backup memory;
   receiving, at the file backup system from the backup memory, information that indicates a storage position of the file in the backup memory;
   determining an address of the cache of the file backup system based on the type of the file and the storage position of the metadata in the data storage device, the storage position of the metadata in the data storage device being indicated by an index node value;
   mapping the type of the file to a storage address of a root node of a corresponding tree in the cache of the file backup system; and
   mapping the metadata to a leaf node of the corresponding tree based on the index node value; and
   storing, in the cache of the file backup system at the determined address, the information that indicates the storage position of the file in the backup memory.

2. The method according to claim 1, wherein the information of the storage position of the file includes position information, type information, a storage unit ID, and offset information of the file in the backup memory.

3. A method for file recovery, comprising:
   receiving, at a file backup system from a data storage device, data for recovering a file;
   determining, based on the received data, metadata describing attributes of the file, the attributes of the file including a type of the file and a storage position of the metadata in the data storage device;
   determining an address of a cache of the file backup system based on the type of the file and the storage position of the metadata in the data storage device, the storage position of the metadata in the data storage device being indicated by an index node value, the determined address specifying a location of the cache;

mapping the type of the file to a storage address of a root node of a corresponding tree in the cache of the file backup system; and mapping the metadata to a leaf node of the corresponding tree based on the index node value;

obtaining, from the location of the cache specified by the determined address, information that indicates a storage position of the file in a backup memory;

obtaining the file from the backup memory based on the storage position of the file; and transmitting the file to implement the file recovery.

4. The method according to claim 3, wherein the data for recovering the file includes the storage position of the metadata.

5. The method according to claim 3, wherein the information of the storage position of the file includes position information, type information, a storage unit ID, and offset information of the file in the backup memory.

6. An electronic device, comprising:

a cache;

at least one processor; and a memory coupled to the at least one processor and having instructions stored thereon which, when executed by the at least one processor, cause the device to perform acts including:

receiving, from a data storage device, a file to be backed up and metadata describing attributes of the file, the attributes of the file including a type of the file and a storage position of the metadata in the data storage device;

storing the metadata into the cache;

storing the file into a backup memory;

receiving, from the backup memory, information that indicates a storage position of the file in the backup memory;

determining an address of the cache based on the type of the file and the storage position of the metadata in the data storage device, the storage position of the metadata in the data storage device being indicated by an index node value;

mapping the type of the file to a storage address of a root node of a corresponding tree in the cache of the file backup system; and mapping the metadata to a leaf node of the corresponding tree based on the index node value; and storing, in the cache at the determined address, the information that indicates the storage position of the file in the backup memory.

7. The electronic device according to claim 6, wherein the information of the storage position of the file includes position information, type information, a storage unit ID, and offset information of the file in the backup memory.

* * * * *